(12) United States Patent
Zhang et al.

(10) Patent No.: US 12,529,085 B2
(45) Date of Patent: Jan. 20, 2026

(54) 1,3/1,4-XYLANASE MLX1034, ITS GENE AND APPLICATIONS THEREOF

(71) Applicant: SHAN DONG UNIVERSITY, Jinan (CN)

(72) Inventors: Yuzhong Zhang, Jinan (CN); Fang Zhao, Jinan (CN); Xiulan Chen, Jinan (CN); Haining Sun, Jinan (CN); Xiaoyan Song, Jinan (CN); Pingyi Li, Jinan (CN)

(73) Assignee: SHAN DONG UNIVERSITY, Jinan (CN)

( * ) Notice: Subject to any disclaimer, the term of this patent is extended or adjusted under 35 U.S.C. 154(b) by 353 days.

(21) Appl. No.: 18/261,847

(22) PCT Filed: Dec. 7, 2021

(86) PCT No.: PCT/CN2021/136034
§ 371 (c)(1),
(2) Date: Jul. 18, 2023

(87) PCT Pub. No.: WO2022/156402
PCT Pub. Date: Jul. 28, 2022

(65) Prior Publication Data
US 2024/0076706 A1    Mar. 7, 2024

(30) Foreign Application Priority Data

Jan. 20, 2021   (CN) .......................... 202110074436.5

(51) Int. Cl.
*C12N 15/03* (2006.01)
*C12N 9/24* (2006.01)
*C12N 15/09* (2006.01)
*C12P 19/14* (2006.01)
*C12R 1/20* (2006.01)

(52) U.S. Cl.
CPC .............. *C12P 19/14* (2013.01); *C12N 9/248* (2013.01); *C12R 2001/20* (2021.05)

(58) Field of Classification Search
CPC ........ C12N 9/248; C12N 15/03; C12N 15/09; C12P 19/14; C12Y 302/01008
See application file for complete search history.

(56) References Cited

PUBLICATIONS

Goeker M. UniProt accession No. A0A4R19G2_9FLAO, Jul. 2019.*

* cited by examiner

*Primary Examiner* — Maryam Monshipouri
(74) *Attorney, Agent, or Firm* — CBM PATENT CONSULTING, LLC

(57) ABSTRACT

MLX1034 is from *Polaribacter* sp. Q13, and has the amino acid sequence of the 1,3/1,4-xylanase MLX1034 is listed in SEQ ID NO.1; a nucleotide sequence of the gene is listed in SEQ ID NO.2; the 1,3/1,4-xylanase MLX1034 in the invention is capable of efficiently and specifically degrading 1,3/1,4-xylan and producing xylooligosaccharides with DP values above one; in addition, the physical and chemical properties of the 1,3/1,4-xylanase MLX1034 are stable enough to hydrolyze 1,3/1,4-xylan at room temperature; the 1,3/1,4-xylanase MLX1034 is suitable for the industrial production of red algal xylooligosaccharides at low energy costs.

4 Claims, 3 Drawing Sheets

Specification includes a Sequence Listing.

SEQUENCE LISTING

<160> NUMBER OF SEQ ID NOS: 4

<210> SEQ ID NO 1
<211> LENGTH: 338
<212> TYPE: PRT
<213> ORGANISM: Polaribacter sp. Q13

<400> SEQUENCE: 1

Met Ile Lys Leu Ile Gly Ser Leu Phe Leu Gly Lys Leu Ser Leu Ile
1               5                   10                  15

Ile Leu Leu Leu Phe Leu Gln Asn Gly Phe Ser Gln Glu Val Lys Pro
            20                  25                  30

Arg Phe Asn Tyr Asn Ala Lys Tyr Glu Pro Glu Lys Gly Ile Tyr His
        35                  40                  45

Gly Ala Gly Gln Asp Lys Asn Gly Phe His Asp Tyr Val Asn Ala Val
    50                  55                  60

Gly Gln Asp Lys Met Pro Ala Ile Tyr Met Thr Tyr Val Asn Ile Thr
65                  70                  75                  80

Ser Pro Val Lys Arg Ile Glu Arg Trp Gly Lys Ser Leu Lys Gln Val
                85                  90                  95

Leu Asp Ser Leu Pro Lys Gly Ile Met Pro Gln Ile Gly Leu Gly Phe
            100                 105                 110

Thr Gly Gly Lys Asp Thr Gly Ala Gly Leu Asp Lys Glu Val Ala Asp
        115                 120                 125

Gly Lys Tyr Asn Lys Gln Leu Gln Ala Phe Tyr Lys Val Leu Leu Asp
    130                 135                 140

Leu Asp Arg Pro Ser Phe Thr Arg Ile Gly Tyr Glu Phe Glu Gly Asp
145                 150                 155                 160

Trp Asn Gly Tyr Ser Pro Glu Ser Phe Lys Lys Val Phe Ile Thr Ile
                165                 170                 175

Ser Lys Ala Phe Lys Glu Lys Asn Ile Lys Ser Ala Thr Val Trp Cys
            180                 185                 190

Ser Gly Gly Gly Ser Ala Asp Phe Ile Ser Leu Asp Lys Leu Met Glu
        195                 200                 205

Tyr Tyr Pro Gly Asp Glu Tyr Val Asp Trp Gly Ile Asp Ile Phe
    210                 215                 220

Ser Pro Glu Glu Phe Asp His Ile Gly Leu Gln Asn Phe Phe Asp Ala
225                 230                 235                 240

Ala His Ile His Lys Arg Pro Val Met Ile Gly Glu Cys Thr Pro Arg
                245                 250                 255

Phe Val Gly Val Leu Asp Gly Glu Thr Ser Trp Gly Lys Trp Phe Lys
            260                 265                 270

Pro Phe Phe Arg Met Leu His Asp Thr Pro Gly Ile Lys Ala Phe Cys
        275                 280                 285

Tyr Ile Asn Trp Asp Trp Glu Tyr Trp Ser Asn Arg Asn Gly Phe Pro
    290                 295                 300

Trp His Asp Trp Lys Asp Ala Arg Ile Glu Lys Asn Pro Phe Val Leu
305                 310                 315                 320

Glu Ala Tyr Lys Lys Glu Met Glu Lys Pro Leu Phe Ile His Leu Asn
                325                 330                 335

Asn Lys

<210> SEQ ID NO 2
<211> LENGTH: 1017
<212> TYPE: DNA

```
<213> ORGANISM: Polaribacter sp. Q13

<400> SEQUENCE: 2
atgataaaat taataggttc attattttta ggtaagttaa gtttaattat tctattgttg        60
tttttgcaaa atggatttag ccaagaggta aaacctcgtt ttaattacaa tgctaaatac       120
gaaccagaaa aaggaattta tcacggtgct ggtcaagata aaaatgggtt tcacgattat       180
gtaaatgctg taggacaaga taaaatgcct gcaatttata tgacgtatgt taatataact       240
tcaccggtaa aaaggattga gcgttgggga aaaagtttaa aacaggtttt agatagtttg       300
cccaaaggga taatgcctca aattggttta gggtttactg gcggtaagga tactggagca       360
ggtttggata agaagtcgc tgatggaaaa tataacaaac aattacaagc attttataaa        420
gtgcttttag atttagacag accctctttt actagaattg gttatgagtt tgaaggcgat       480
tggaacggct attcacctga aagtttttaaa aaagtgttca tcactatttc aaaggcattt      540
aaagaaaaga atataaaatc ggctacggtt tggtgctcag gtggggctc tgcagatttt        600 ataagtcttg ataagttgat ggaatactat cctggtgatg aatatgtaga ttggtggggt       660
atcgatattt ttagtcctga agaatttgat catattggtt tacaaaactt ttttgatgca      720
gcgcatattc ataaaagacc cgttatgatt ggcgagtgta ctccacgatt tgtaggtgtt       780
ttagatggtg aaacttcttg gggaaaatgg ttcaaacctt tttttagaat gttacatgat       840
accccaggaa taaaagcatt tgctacatc aattgggatt gggaatattg gtctaacaga        900
aatggttttc catggcatga ttggaaagat gcacgtatcg aaaaaaatcc atttgtatta       960
gaggcttata aaaaagaaat ggagaagcca ttatttattc accttaataa taaataa        1017

<210> SEQ ID NO 3
<211> LENGTH: 41
<212> TYPE: DNA
<213> ORGANISM: Artificial Sequence
<220> FEATURE:
<223> OTHER INFORMATION: It is synthesized

<400> SEQUENCE: 3
aagaaggaga tatacatatg caagaggtaa aacctcgttt t                            41

<210> SEQ ID NO 4
<211> LENGTH: 41
<212> TYPE: DNA
<213> ORGANISM: Artificial Sequence
<220> FEATURE:
<223> OTHER INFORMATION: It is synthesized.

<400> SEQUENCE: 4
tggtggtggt ggtgctcgag tttattatta aggtgaataa a                            41
```

1,3/1,4-XYLANASE MLX1034, ITS GENE AND APPLICATIONS THEREOF

INCORPORATION BY REFERENCE OF SEQUENCE LISTING

The Sequence Listing in the ASCII text file, named as amd230700_ST25.txt (Size: 5,094 bytes; and Date of Creation: Oct. 10, 2025), and submitted to the United States Patent and Trademark Office via EFS-Web, is incorporated herein in the invention.

FIELD

The invention relates to the 1,3/1,4-xylanase MLX1034, gene and applications thereof, belonging to the technical field of biotechnology.

BACKGROUND

Xylan, the main component of hemicellulose, is the second most abundant biopolymer after cellulose. Xylans in the cell walls of land plants are complex heteropolymers, known as heteroxylans. The backbones of heteroxylans are composed of β-1,4-linked xylose and are generally decorated with α-L-arabinofuranose, 4-O-methyl-glucuronic acid, acetate, or ferulic acid. Thus, a large diversity of xylanolytic enzymes is required for the complete hydrolysis of heteroxylans, among which endolytic 1,4-xylanases play a leading role.

1,4-xylooligosaccharides are composed of two to seven β-1,4-linked xylose residues. Extensive studies have suggested that 1,4-xylooligosaccharides are capable of preferentially stimulating the growth of prebiotic bacteria (e.g., *Bifidobacterium*) in the gastrointestinal tract, modulating gut microbiota, enhancing immune function and exhibiting beneficial effects on reducing hypertension, hyperglycemia and cholesterol, and anti-cancer. Therefore, 1,4-xylooligosaccharides are widely used in industries of food, medicine, cosmetics and feed additives. At present, 1,4-xylooligosaccharides are mainly prepared from corn cobs, wheat brans and bagasse by enzymatic or chemical catalysis.

Xylans in the ocean are mainly from the cell walls of red and green algae with structures different from heteroxylans in land plants. Xylans from marine algae include 1,3-xylan, 1,4-xylan and mixed-linkage 1,3/1,4-xylan, all of which are linear homoxylans composed of only xylose residues. 1,3/1,4-xylan is the main polysaccharide component of many red algae in the orders Palmariales and Nemaliales. Amongst, *Palmaria palmata* (also called dulse) from the order Palmariales is a famous economic seaweed, which is widely distributed on the northern coasts of the Atlantic and Pacific oceans. Due to the abundance of dietary fiber, protein, vitamins, and antioxidant and anti-inflammatory materials, *Palmaria palmata* becomes a popular red sea vegetable, especially in Europe and Japan. Water-soluble 1,3/1,4-xylan is known from *Palmaria palmata*, which contains both β1,3- and 1,4-linkages at a ratio of approximately 1:4 with an irregular distribution of single β1,3-linkages along the β1,4-linked backbone. 1,3/1,4-xylan from *Palmaria Palmata* has been commercialized.

Due to the huge primary productivity of marine red algae, there are huge 1,3/1,4-xylan resources in the ocean. With the 1,3/1,4-xylan as raw materials, novel branchless xylooligosaccharides containing β-1,3-linkages can be prepared, which are different from the known 1,4-xylooligosaccharides. The novel xylooligosaccharides have a good application prospect. However, there is still a lack of efficient 1,3/1,4-xylanases to prepare xylooligosaccharides from 1,3/1,4-xylan.

SUMMARY

In view of the state of the art, the present invention provides the 1,3/1,4-xylanase MLX1034, gene and applications thereof.

The technical solution of the present invention is as follows:

The present invention provides a 1,3/1,4-xylanase, MLX1034. The amino acid sequence of the 1,3/1,4-xylanase is listed in SEQ ID NO.1.

According to the present invention, preferably, the 1,3/1,4-xylanase MLX1034 is an endolytic enzyme from *Polaribacter* sp. Q13. *Polaribacter* sp. Q13 is deposited in China Center for Type Culture Collection at Jialuoshan, Bayi Road, Wuhan City, Hubei Province on Dec. 28, 2020. The deposit number is CCTCC M 2020985.

When the 1,3/1,4-xylanase MLX1034 degrades 1,3/1,4-xylan, the end products are xylooligosaccharides with degrees of polymerization (DP) above one and the main product is xylohexaose.

The nucleotide sequence of the gene encoding the above 1,3/1,4-xylanase MLX1034 is listed in SEQ ID NO.2.

According to the present invention, preferably, the gene encoding the 1,3/1,4-xylanase MLX1034 is cloned from the genomic DNA of *Polaribacter* sp. Q13. *Polaribacter* sp. Q13 is deposited in China Center for Type Culture Collection at Jialuoshan, Bayi Road, Wuhan City, Hubei Province on Dec. 28, 2020. The deposit number is CCTCC M 2020985.

A recombinant expression vector incorporating the gene encoding the 1,3/1,4-xylanase MLX1034.

According to the present invention, preferably, the recombinant expression vector is constructed with the plasmid pET-22b.

According to the present invention, preferably, the recombinant expression vector is transformed into a host cell to produce recombinant cells.

According to the present invention, preferably, the host cell is *Escherichia coli*.

According to the present invention, preferably, the *E. coli* is *E. coli* BL21 (DE3).

A recombinant cell incorporating the gene encoding the 1,3/1,4-xylanase MLX1034.

A recombinant expression strain, the strain is obtained by cultivating the recombinant cell.

According to the present invention, preferably, the recombinant cell is cultivated in the Luria-Bertani (LB) medium at 37° C. in shake flasks to an optical density at 600 nm ($OD_{600\ nm}$) of approximately 0.8~1.0.

According to the present invention, preferably, after $OD_{600\ nm}$ reaches 0.8~1.0, IPTG is added to induce protein expression and the recombinant expression strain is collected.

According to the present invention, preferably, the 1,3/1,4-xylanase MLX1034 is derived from the recombinant expression strain.

According to the present invention, applications of the 1,3/1,4-xylanase MLX1034 in the degradation of 1,3/1,4-xylan.

A method for the degradation of 1,3/1,4-xylan. In detail, the gene, whose nucleotide sequence is listed in SEQ ID NO.2, is inserted into the plasmid pET-22b to obtain the recombinant expression vector. The recombinant expression vector is transformed into a host cell to obtain recombinant cells. The recombinant cells are cultivated in fermentation medium and produce the 1,3/1,4-xylanase MLX1034. 1,3/1,4-xylan is hydrolyzed by the 1,3/1,4-xylanase MLX1034.

A method for the preparation of xylooligosaccharides. In detail, the gene, whose nucleotide sequence is listed in SEQ ID NO.2, is inserted into a plasmid to obtain the recombinant expression vector. The recombinant expression vector is transformed into a host cell to obtain recombinant cells. The recombinant cells are cultivated in fermentation medium and produce the 1,3/1,4-xylanase MLX1034. 1,3/1,4-xylan is hydrolyzed by the 1,3/1,4-xylanase MLX1034 to obtain xylooligosaccharides.

According to the present invention, preferably, the DP values of the xylooligosaccharides are above one.

According to the present invention, preferably, the main component of the xylooligosaccharides is xylohexaose.

According to the present invention, preferably, the plasmid is pET-22b.

According to the present invention, preferably, the host cell is E. coli, further preferably E. coli BL21 (DE3).

According to the present invention, preferably, the recombinant cell is cultivated in LB medium at 37° C. in shake flasks to an $OD_{600\ nm}$ of approximately 0.8~1.0. Preferably, after $OD_{600\ nm}$ reaches 0.8~1.0, IPTG is added to induce protein expression and the cells are collected by centrifugation.

The technical characteristics of the present invention is as follows:

*Polaribacter* sp. Q13 according to the present invention is isolated from the surface of red algae collected from Nelson Island, Antarctic. Based on the genomic and secretomic data, MLX1034 is identified as an extracellular 1,3/1,4-xylanase secreted by *Polaribacter* sp. Q13. The gene MLX1034 is 1017 bp in length and encodes 338 amino acid residues. Sequence analysis indicates that MLX1034 contains an N-terminal signal peptide (Met1-Ser27) with a calculated molecular weight of 39.1 kDa. MLX1034 have a single catalytic domain of glycoside hydrolase (GH) family 26, which is a previously unreported 1,3/1,4-xylanase with a new amino acid sequence. To obtain the recombinant strain, the gene MLX1034 is cloned from the genomic DNA of *Polaribacter* sp. Q13 and incorporated into *E. coli*. The 1,3/1,4-xylanase MLX1034 is expressed in the recombinant strain. The 1,3/1,4-xylanase MLX1034 is inactive on 1,4-xylan, displays little activity on 1,3-xylan, but efficiently hydrolyzes 1,3/1,4-xylan, indicating that it is a 1,3/1,4-xylan-specific xylanase. The 1,3/1,4-xylanase MLX1034 shows the maximum activity at 40° C. and pH 7.0 in the phosphate buffered saline (PBS), indicating that it is a neutral and mesophilic enzyme. High performance liquid chromatography (HPLC) of the hydrolysis products released from 1,3/1,4-xylan by MLX1034 indicates that MLX1034 is a strict endolytic xylanase. The main product of MLX1034 at each time point is xylohexaose with no xylose, indicating that the 1,3/1,4-xylanase MLX1034 is an effective tool enzyme to prepare xylooligosaccharides from 1,3/1,4-xylan.

Advantageous Effects of the Invention

The 1,3/1,4-xylanase MLX1034 according to the present invention is from *Polaribacter* sp. Q13. The 1,3/1,4-xylanase MLX1034 can be easily produced in *E. coli* and purified to high purity. The 1,3/1,4-xylanase MLX1034 can efficiently and specifically degrade 1,3/1,4-xylan and generate xylooligosaccharides with DP values of two to eight. In addition, the 1,3/1,4-xylanase MLX1034 is stable at room temperature and suitably used in red algal xylooligosaccharides preparation at a low cost.

In addition, when the 1,3/1,4-xylanase MLX1034 degrades 1,3/1,4-xylan, the main product at each time point is xylohexaose with no xylose. Thus, the 1,3/1,4-xylanase MLX1034 has significant advantages in technics optimization.

DETAILED DESCRIPTION OF THE PREFERRED EMBODIMENTS

Figure 1:
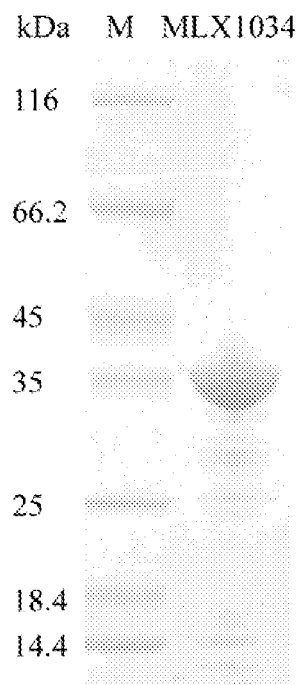
FIG. 1 SDS-PAGE analysis of the recombinant 1,3/1,4-xylanase MLX1034. M, protein marker.

The present invention will be further described below through drawings and embodiments. It is to be understood that the invention is not limited to the embodiments described below, and any form of modifications and/or changes made to the invention are intended to fall within the scope of the invention.

The materials used in the present invention are described below.

A bacterial strain, *Polaribacter* sp. Q13, has been deposited in China Center for Type Culture Collection at Jialuoshan, Bayi Road, Wuhan City, Hubei Province on Dec. 28, 2020. The deposit number is CCTCC M 2020985.

1,3/1,4-xylan from *Palmaria palmata* was purchased from Elicityl (France). The proportion between β-1,3- and β-1,4-linkages is approximately 1:4.

1,3-xylan was extracted from *Caulerpa lentillifera*.

Wheat arabinoxylan and beech wood xylan were purchased from Megazme (Ireland).

TYS broth medium contained 0.5% (w/w) tryptone and 0.1% (w/w) yeast extract in artificial seawater [3.0% (w/w) sea salts (Sigma, USA) in $ddH_2O$]. The pH was adjusted to 7.8.

TYS agar medium contained 0.5% (w/w) tryptone, 0.1% (w/w) yeast extract and 1.5% (w/w) agar in artificial seawater. The pH was adjusted to 7.8.

Luria-Bertani (LB) medium contained 1.0% (w/w) tryptone, 0.5% (w/w) yeast extract and 1.0% (w/w) NaCl in $ddH_2O$.

LB agar medium contained 1.0% (w/w) tryptone, 0.5% (w/w) yeast extract, 1.0% (w/w) NaCl and 1.5% (w/w) agar in $ddH_2O$.

1,3/1,4-xylan agar medium contained 0.2% (w/w) 1,3/1,4-xylan and 1.5% (w/w) agar in artificial seawater. The pH was adjusted to 7.8.

Example 1 Isolation of *Polaribacter* sp. Q13

Red algal samples were collected from Nelson Island, *Antarctica*. These algal samples were washed with sterile artificial seawater to obtain epiphytic bacteria from the algal surface. After gradient dilution ($10^{-2}$-$10^{-6}$), the bacteria-containing seawater was spread on TYS agar plates. Then the bacteria were incubated at 20° C. until detectable colonies formed. Morphologically different colonies were selected, purified with TYS agar, and then cryopreserved at −80° C. in TYS broth supplemented with glycerol [TYS broth: glycerol=3:7 (v/v)]. Furthermore, the purified strains were cultivated on 1,3/1,4-xylan agar plates to screen 1,3/1,4-xylan-utilizing bacteria. Finally, one bacterial strain, designated as Q13, was found to grow on the 1,3/1,4-xylan agar plate.

After 3~4 days cultivation on the 1,3/1,4-xylan agar plate, colonies of strain Q13 were yellow, moist and circular with regular edges and smooth surfaces. Cells of strain Q13 were Gram-stain-negative. Strain Q13 was identified as a species of the genus *Polaribacter* (*Polaribacter* sp.).

*Polaribacter* sp. Q13 has been deposited in China Center for Type Culture Collection at Jialuoshan, Bayi Road, Wuhan City, Hubei Province on Dec. 28, 2020. The deposit number is CCTCC M 2020985.

Example 2 Cloning of the Gene MLX1034 and Construction of the Recombinant Plasmid pET-22b-MLX1034

1. Genomic DNA extraction and whole genome sequencing of *Polaribacter* sp. Q13. *Polaribacter* sp. Q13 was cultivated in TYS broth at 20° C. and 180 rpm for 24 h. Then the bacterial cells were collected and the genomic DNA was extracted using a bacterial genomic DNA isolation kit (BioTeke, China) according to the manual instruction. The whole-genome sequencing was carried out at the Beijing Genomics Institute (BGI; Beijing, China).
2. Primer design and synthesis. Based on the genomic data of *Polaribacter* sp. Q13, the nucleotide sequence of the gene MLX1034 and the amino acid sequence of its product (MLX1034) were obtained. Using SignalP-5.0, the signal peptide of MLX1034 was predicted as Met1-Ser27. After deleting the predicted signal peptide, a forward primer (F: 5'-AAGAAGGAGATATA-CATATGCAAGAGGTAAAACCTCGTTTT-3' (SEQ ID NO: 3) and a reverse primer (R: 5'-TGGTGGTGGTGGTGCTCGAGTTTATTAT-TAAGGTGAATAAA-3' (SEQ ID NO: 4) were designed and synthesized at BGI (Beijing, China).
3. PCR amplification and PCR product recovery. PCR amplification was performed using primers F and R with the genomic DNA of *Polaribacter* sp. Q13 as the template. The PCR program was determined as pre-denaturation at 95° C. for 2 min, followed by 30 cycles of PCR (denaturation at 95° C. for 30 s, annealing at 55° C. for 20 s and extension at 72° C. for 45 s), and a final extension step at 72° C. for 10 min. The 50 μL PCR mixture contained 29 μL sterile ddH$_2$O, 10 μL Trans Star Fast Pfu buffer (TransGen, China), 5 μL dNTP, 2 μL primer F, 2 μL primer R, 1 μL genomic DNA of strain Q13 and 1 μL Trans Star Fast Pfu DNA polymerase (TransGen, China). The amplification products were purified by the 1.0% (w/w) agarose gel electrophoresis and a gel extraction kit (Omega, USA), and the MLX1034 fragment was obtained.
4. Construction of the recombinant plasmid pET-22b-MLX1034. The pET-22b vector (Novagen, USA) was digested with the restriction enzymes NdeI and XhoI and the linear product was purified by the 1.0% (w/w) agarose gel electrophoresis and a gel extraction kit (Omega, USA). Then, the obtained MLX1034 fragment was inserted into the digested pET-22b with the In-Fusion HD Cloning Kit (TaKaRa, Japan). The 2.5 μL reaction mixture contained 1 μL MLX1034 fragment, 1 μL digested pET-22b and 0.5 μL In-Fusion.

Using the heat shock method described in "Molecular cloning: A laboratory manual", the assembled vector was transformed into the competent *Escherichia coli* DH5a cells (TransGen, China). In detail, 2.5 μL ligation products were added into 50 μL competent *E. coli* DH5a cells. After an incubation in ice for 30 min, the mixture is placed at 42° C. for 90 s and then placed back in ice for 10 min. 200 μL LB was added and the and the transformed cells were incubated at 37° C. for 1 h. The resultant cells were spread on the LB agar plate containing 100 μg/mL ampicillin and incubated at 37° C. overnight. Single colonies were picked and cultivated in LB containing 100 μg/mL ampicillin at 37° C. overnight. The cells were collected and sent to BGI (Beijing, China) for plasmid extraction and gene sequencing.

The result of gene sequencing showed that MLX1034 was successfully inserted into the NdeI-XhoI restriction site of pET22b with no substitution, deletion or insertion mutations. The recombinant plasmid was named pET-22b-MLX1034.

Example 3 Expression and Purification of the 1,3/1,4-Xylanase MLX1034

1. Expression of the 1,3/1,4-xylanase MLX1034 in *E. coli* BL21 (DE3). The recombinant plasmid pET-22b-MLX1034 was transformed into the competent *E. coli* BL21 (DE3) cells (TransGen, China) with the heat shock method as mentioned above. The resultant cells were spread on the LB agar plate containing 100 μg/mL ampicillin and cultivated at 37° C. overnight. A single colony was picked and cultivated in LB containing 100 μg/mL ampicillin at 37° C. overnight, obtaining seed culture. The seed culture (1%, v/v) was inoculated into LB containing 100 μg/mL ampicillin and cultivated at 180 rpm and 37° C. to an optical density (OD) at 600 nm of approximately 0.8~1.0. Then, 0.1 mM isopropyl-D-thiogalactopyranoside (IPTG) was added to the culture as an inducer, and the culture was incubated at 18° C. and 120 rpm for 16 h. The induced cells were harvested by centrifugation (7,000 rpm for 5 min at 4° C.).
2. Purification of the 1,3/1,4-xylanase MLX1034. The obtained cells were resuspended in the lysis buffer (50 mM Tris-HCl, 100 mM NaCl, pH 8.0) and lysed by a pressure crusher. After centrifugation (12,000 rpm for 60 min at 4° C.), the supernatant, namely crude enzyme solution, was collected.

The crude enzyme solution was loaded onto the nickel affinity column (GE Healthcare, USA), which was pre-equilibrated with the lysis buffer. Then, the nickel affinity column was washed with 10 column volumes of the wash buffer (50 mM Tris-HCl, 100 mM NaCl, 10 mM imidazole, pH 8.0). The target protein (MLX1034) was eluted with the elution buffer (50 mM Tris-HCl, 100 mM NaCl, 250 mM imidazole, pH 8.0).

The obtained sample was concentrated and loaded onto the gel filtration (GF) column (Superdex 200 Prep grade; GE Healthcare, USA), which was pre-equilibrated with the GF buffer (10 mM Tris-HCl, 100 mM NaCl, pH 8.0). The sample was then eluted with the GF buffer. Samples of the target protein peak were collected and stored at −80° C. with the addition of 10% (v/v) glycerol for further use.

The purity and molecular weight of the purified MLX1034 were determined with SDS-PAGE. The result is shown in FIG. 1.

As shown in FIG. 1, the purified MLX1034 exhibited an apparent molecular weight of approximately 35.0 kDa, consistent with its theoretical molecular weight (39.1 kDa). Therefore, MLX1034 was successfully expressed in *E. coli* BL21 (DE3).

Example 4 Enzymatic Properties of the 1,3/1,4-Xylanase MLX1034

The standard reaction mixture contained 90 μL xylan [10 mg/mL in 20 mM phosphate-buffered saline (PBS)] and 10 μL enzyme solution of the 1,3/1,4-xylanase MLX1034.

The xylanase activity was determined by the dinitrosalicylic acid (DNS) method. The reaction mixture was incubated at 40° C. for 10 min. After incubation, the reaction was terminated by the addition of 100 μL DNS. Then the reaction mixture was boiled at 100° C. for 5 min for coloring. After the addition of 500 μL ddH$_2$O, the OD$_{550\ nm}$ was measured. The reaction mixture supplemented with the inactivated MLX1034 was used as the control. One unit of enzyme activity (1 U) is defined as the amount of enzyme required to release 1 μmol xylose per min. A standard curve was generated with different concentrations of xylose.

Enzymatic properties of the 1,3/1,4-xylanase MLX1034 were analyzed according to the method.

1. Substrate specificity analysis. The substrate specificity of the 1,3/1,4-xylanase MLX1034 was analyzed with 1,3/1,4-xylan, 1,3-xylan and 1,4-xylans (including wheat arabinoxylan and beech wood xylan) as the substrates. The result is shown in Table 1.

As shown in Table 1, the 1,3/1,4-xylanase MLX1034 efficiently hydrolyzed 1,3/1,4-xylan (224.0 U/mg) with extremely low activity on 1,3-xylan (0.04 U/mg) and no activity on 1,4-xylans (including wheat arabinoxylan and beech wood xylan).

TABLE 1

The substrate specificity of the 1,3/1,4-xylanase MLX1034.

| Substrate | Specific activity (U/mg) |
| --- | --- |
| 1,3/1,4-xylan | 224.0 ± 13.5 (100%) |
| 1,3-xylan | 0.04 ± 0.00 (0.02%) |
| Wheat arabinoxylan | Not detectable |
| Beech wood xylan | Not detectable |

2. Effect of temperature on enzymatic activity and stability. To determine the effect of temperature on the activity of the 1,3/1,4-xylanase MLX1034, 1,3/1,4-xylan was used as the substrate. Reaction mixtures were separately incubated at 0° C., 10° C., 20° C., 30° C., 40° C., 50° C. and 60° C. for 10 min, and the activities of the 1,3/1,4-xylanase MLX1034 at different temperatures were determined. The maximum activity was taken as 100% to calculate the relative activities. The result is shown in FIG. 2.

To determine the effect of temperature on the stability of the 1,3/1,4-xylanase MLX1034, it was separately incubated at 40° C., 50° C. and 60° C. for 60 min. During incubation, the residual activities were determined every 10 min with 1,3/1,4-xylan as the substrate. The specific activity of the 1,3/1,4-xylanase MLX1034 without incubation (0 min) was taken as 100% to calculate the residual activities. The result is shown in FIG. 3.

Figure 2:
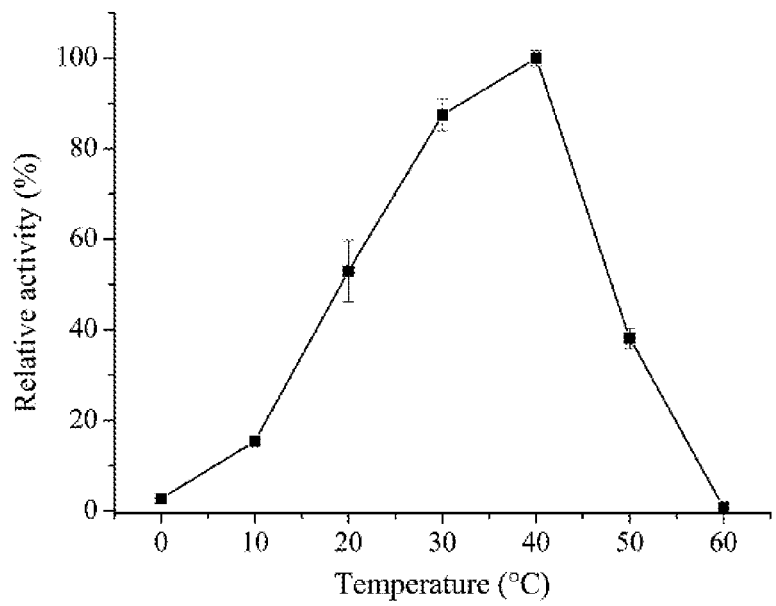
FIG. 2 Effect of temperature on the activity of the 1,3/1,4-xylanase MLX1034.
Figure 3:
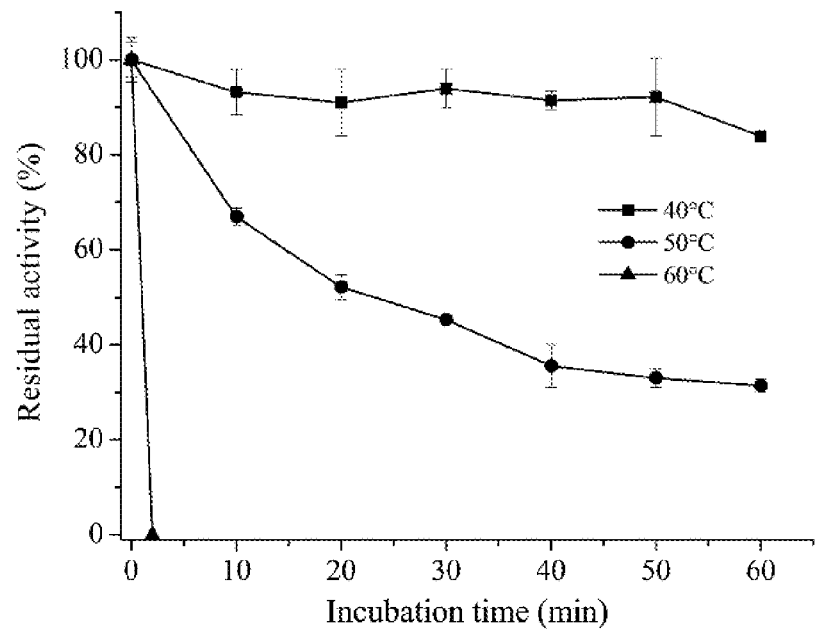
FIG. 3 Effect of temperature on the stability of the 1,3/1,4-xylanase MLX1034.

As shown in FIGS. 2 and 3, the 1,3/1,4-xylanase MLX1034 exhibited more than 80% activity at 30~45° C. with the maximum activity at 40° C. It was relatively stable at 40° C., retaining more than 80% residual activities during 60 min incubation. After 60 min incubation at 50° C., the residual activity of the 1,3/1,4-xylanase MLX1034 decreased to less than 40%. It was extremely unstable at 60° C. and rapidly deactivated within 5 min.

3. Effect of pH on enzymatic activity and stability. To determine the effect of pH on the activity of the 1,3/1,4-xylanase MLX1034, reactions were carried out at 40° C. for 10 min under different pH values from 3.0 to 11.0 with 1,3/1,4-xylan as the substrate. The buffers used were 20 mM citrate buffer at pH 3.0~6.0, 20 mM PBS at pH 6.0~8.0, 20 mM Tris-HCl at pH 8.0~9.0, and 20 mM glycine-NaOH at pH 9.0~11.0. The maximum activity was taken as 100% to calculate the relative activities. The result is shown in FIG. 4.

To determine the effect of temperature on the stability of MLX1034, each of the buffers with different pH values was mixed with the 1,3/1,4-xylanase MLX1034 at a volume ratio of 49:1. The buffers used were 20 mM citrate buffer at pH 3.0~6.0, 20 mM PBS at pH 6.0~8.0, 20 mM Tris-HCl at pH 8.0~9.0, and 20 mM glycine-NaOH at pH 9.0~11.0. After incubation at 60° C. for 1 h, the residual activities of the 1,3/1,4-xylanase MLX1034 were determined with 1,3/1,4-xylan as the substrate. The maximum activity was taken as 100% to calculate the residual activities. The result is shown in FIG. 5.

Figure 4:
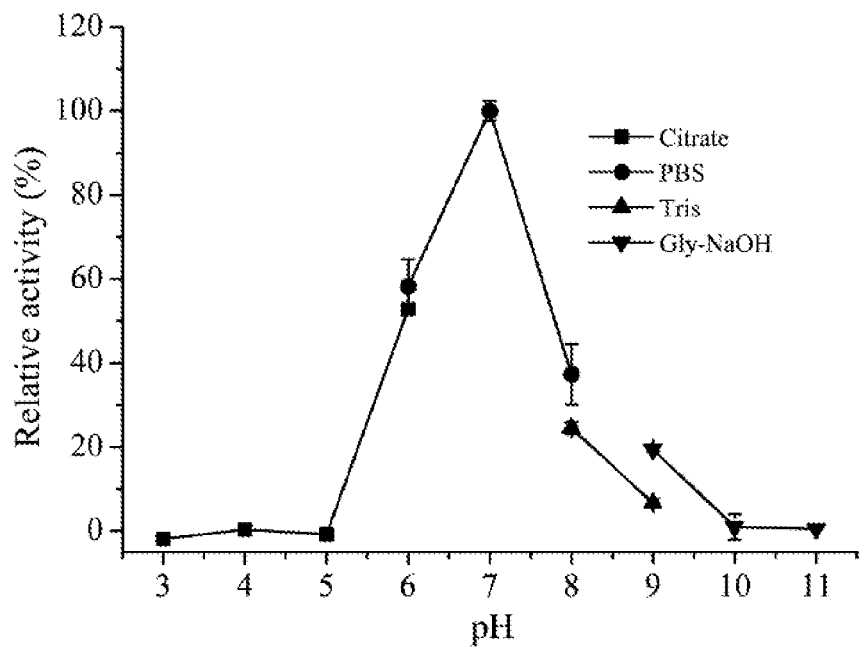
FIG. 4 Effect of pH on the activity of the 1,3/1,4-xylanase MLX1034.
Figure 5:
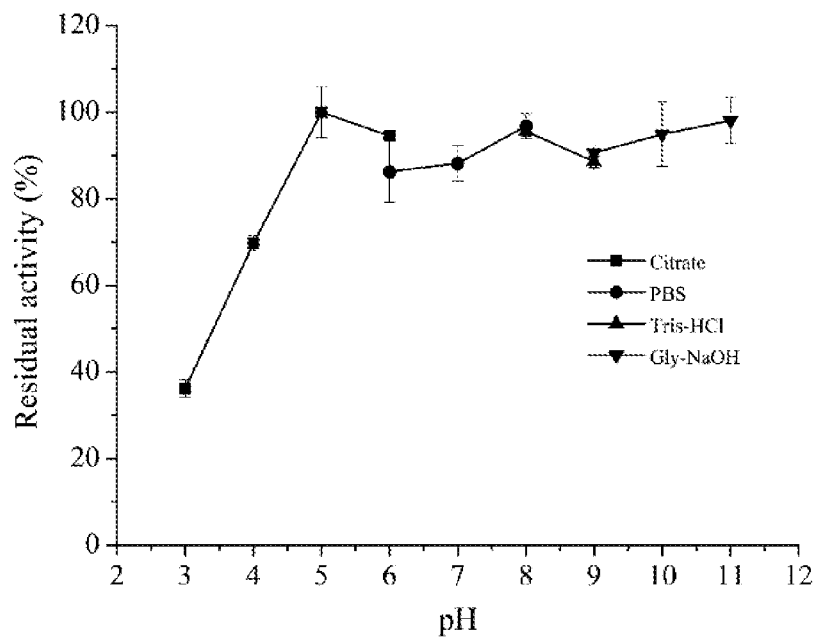
FIG. 5 Effect of pH on the stability of the 1,3/1,4-xylanase MLX1034.

As shown in FIGS. 4 and 5, the 1,3/1,4-xylanase MLX1034 exhibited the highest activity at pH 7.0. It was unstable under acidic conditions (pH 3.0~4.0) but stable at pH 5.0~11.0.

Example 5 Mode of Action Analysis of the 1,3/1,4-Xylanase MLX1034

A reaction mixture containing 1,3/1,4-xylan (5 mg/mL in 20 mM PBS, pH 7.0) and the 1,3/1,4-xylanase MLX1034 at a volume ratio of 99:1 was incubated at 30° C. At the reaction time of 6 min, 10 min, 1 h and 24 h, samples were taken out separately and boiled for 5 min. Then samples were filtered with a 0.22 μM filter, obtaining the degradation products.

The degradation products were analyzed using HPLC equipped with an evaporative light scattering detector (ELSD) and a Superdex 30 Increase 10/300 GL column (GE Healthcare, USA). The mobile phase was ddH$_2$O. A mixture of xylose and 1,4-xylooligosaccharides (1,4X2-X6) was used as the marker. The result is shown in FIG. 6.

Figure 6:
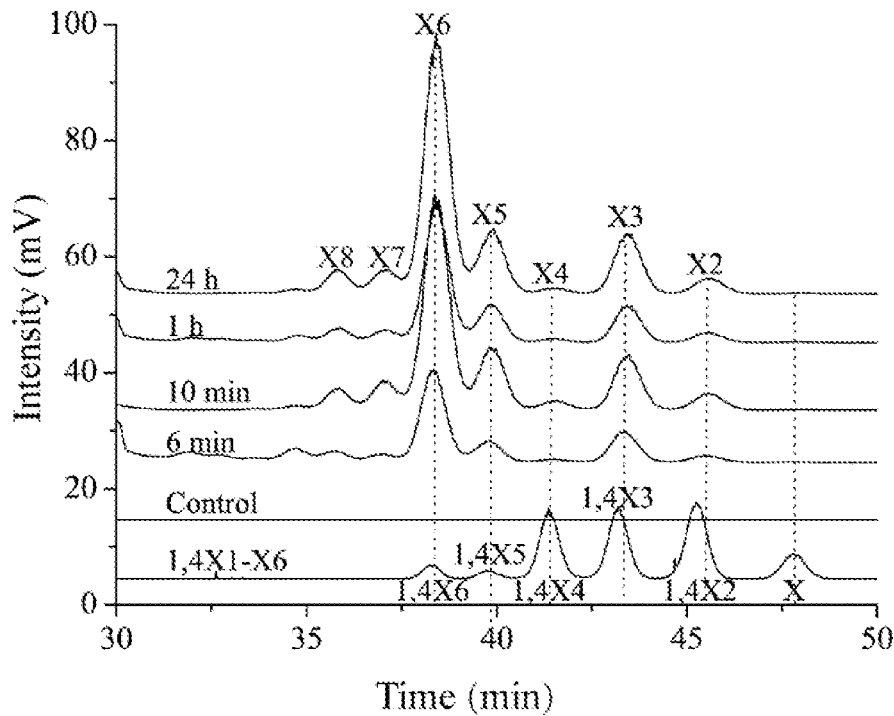
FIG. 6 High-performance liquid chromatography (HPLC) analysis of the released xylooligosaccharides from 1,3/1,4-xylan by the 1,3/1,4-xylanase MLX1034. The reaction mixture without the 1,3/1,4-xylanase MLX1034 was used as the control.

As shown in FIG. 6, the 1,3/1,4-xylanase MLX1034 is an endolytic xylanase. The degradation products were xylooligosaccharides with DP values above one with xylohexaose as the main product. At each time point of the reaction within 24 h, only xylooligosaccharides (DP>2) were produced with no xylose.

What is claimed is:

1. A recombinant bacterium is *Polaribacter* sp. Q13 deposited in China Center for Type Culture Collection under the deposit number: CCTCC M 2020985.

2. The recombinant bacterium according to claim 1, wherein the *Polaribacter* sp. Q13 comprises an expression vector that includes a gene having the nucleotide sequence shown as SEQ ID NO. 2.

3. The recombinant bacterium according to claim 2, wherein the gene expresses a recombinant 1,3/1,4-xylanase MLX1034 protein having the amino acid sequence shown as SEQ ID NO. 1.

4. A method for preparing xylooligosaccharides comprising a step of degrading 1,3/1,4-xylan by utilizing the recombinant bacterium of claim 3.

* * * * *